(12) United States Patent  
De Jong (10) Patent No.: US 6,996,213 B1  
(45) Date of Patent: Feb. 7, 2006

(54) SUPERPOSITION OF DATA OVER VOICE

(75) Inventor: Eduard Karel De Jong, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/806,279

(22) PCT Filed: Sep. 29, 1998

(86) PCT No.: PCT/NL98/00563

§ 371 (c)(1), (2), (4) Date: Jul. 6, 2001

(87) PCT Pub. No.: WO00/19699

PCT Pub. Date: Apr. 6, 2000

(51) Int. Cl.
*H04M 11/00* (2006.01)

(52) U.S. Cl. .................... 379/93.08; 329/93.18; 329/93.27; 370/493

(58) Field of Classification Search .............. 379/90.01, 379/93.05, 93.06, 93.08, 93.18, 93.26, 93.27, 379/93.28, 102.01, 102.02, 386, 283, 361; 370/493, 495, 527

See application file for complete search history.

(56) References Cited

U.S. PATENT DOCUMENTS

| 4,425,642 A | 1/1984 | Moses et al. |
| 4,930,129 A | 5/1990 | Takahira |
| 4,953,160 A | * 8/1990 | Gupta ........................ 370/494 |

(Continued)

FOREIGN PATENT DOCUMENTS

| DE | 4126213 | 2/1993 |
| EP | 0190733 | 8/1986 |
| EP | 0466969 | 1/1992 |
| EP | 0666550 | 5/1995 |
| JP | 01277993 A | 11/1989 |
| JP | 02156357 A | 6/1990 |
| JP | 05089303 A | 4/1993 |
| WO | WO 87/07062 | 11/1987 |
| WO | WO 94/10657 | 5/1994 |
| WO | WO 98/19237 | 5/1998 |
| WO | WO 98/37526 | 9/1998 |
| WO | WO 99/16030 | 9/1998 |

OTHER PUBLICATIONS

Chan, "Infrastructure of Multi–Application Smart Card," http://home.hkstar.com/~alanchan/papers/multiApplicationSmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

Daniels, John et al., "Strategies for Sharing Objects in Distributed Systems," JOOP, Object Designers Ltd., Uk., pp. 27–36.

(Continued)

*Primary Examiner*—Melur Ramakrishnaiah
(74) *Attorney, Agent, or Firm*—Finnegan, Henderson, Farabow, Garrett & Dunner, L.L.P.

(57) ABSTRACT

Method and apparatus for transmitting messages between communication devices via a communication channel allowing at least voice messages to be transmitted, the messages including data subdivided in a sequence of basic data units, the method including; a) encoding the basic data units as unique signals ($us_j$) including a predetermined number of basic signals ($b_i$), each basic signal having a unique fixed frequency ($f_i$); b) transmitting a sequence of unique signals ($us_j$) during a sequence of fixed time periods (t1, t2, t3, . . .); c) receiving and decoding the sequence of unique signals ($us_j$) into the sequence of basic data units; the data being transmitted in superposition over voice.

40 Claims, 3 Drawing Sheets

U.S. PATENT DOCUMENTS

| | | | |
|---|---|---|---|
| 5,057,997 | A | 10/1991 | Chang et al. |
| 5,204,663 | A | 4/1993 | Lee |
| 5,204,897 | A | 4/1993 | Wyman |
| 5,404,377 | A | 4/1995 | Moses |
| 5,446,901 | A | 8/1995 | Owicki et al. |
| 5,452,431 | A | 9/1995 | Bournas |
| 5,481,715 | A | 1/1996 | Hamilton et al. |
| 5,544,246 | A | 8/1996 | Mandelbaum et al. |
| 5,594,227 | A | 1/1997 | Deo |
| 5,649,118 | A | 7/1997 | Carlisle et al. |
| 5,657,379 | A * | 8/1997 | Honda et al. ............ 379/93.28 |
| 5,721,781 | A | 2/1998 | Deo et al. |
| 5,742,756 | A | 4/1998 | Dillaway et al. |
| 5,768,385 | A | 6/1998 | Simon |
| 5,781,723 | A | 7/1998 | Yee et al. |
| 5,802,519 | A | 9/1998 | De Jong |
| 5,884,316 | A | 3/1999 | Bernstein et al. |
| 5,894,550 | A | 4/1999 | Thiriet |
| 5,912,453 | A | 6/1999 | Gungl et al. |
| 5,930,363 | A | 7/1999 | Stanford et al. |
| 6,052,690 | A | 4/2000 | de Jong |
| 6,094,656 | A | 7/2000 | De Jong |
| 6,173,391 | B1 | 1/2001 | Tabuchi et al. |
| 6,182,158 | B1 | 1/2001 | Kougiouris et al. |
| 6,212,633 | B1 | 4/2001 | Levy et al. |
| 6,220,510 | B1 | 4/2001 | Everett et al. |
| 6,292,874 | B1 | 9/2001 | Barnett |
| 6,349,336 | B1 | 2/2002 | Sit et al. |

OTHER PUBLICATIONS

Gong, L. et al., "Going Beyond the Sandbox: An Overview of the New Security Architecture in the JavaDevelopment Kit 1.2" Proc. Usenix. Sym. Internet Technologies and Systems, Dec. 8, 1997.

Islam, et al., "A Flexible Security Model for Using Internet Content," IBM Thomas J. Watson Research Center Papers, 'Online ?', Jun. 8, 1997, *http://www.ibm.com/java/education/flexsecurity*.

Lee, Chan Y., "Detecting Out–Of–Range References," *http://127.0.0.1:8080/vtopic/isapi?action+View&VdkVgwKev=2E@2E2Fdata2F1993%2F*, Jul. 24, 2002.

Philips Semiconductor, "Designers Offered First 16–Bit Smart Card IC Architecture with Development Tools," Press Release, Jul. 25, 2002.

Ritchey, Tim, "Advanced Topics: The Java Virtual Machine," Java?, Chapter 14, pp. ii–x and 325–346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

Sun Microsystems, Announces "Java Card™" to Business Wire, Oct. 1996.

Sun Microsystems, Inc., "Java Card Runtime Environment (JCRE) 2.1 Specificatioin –Draft 2," Dec. 14, 1998.

"Java Card Applet Developer's Guide," Revision 1.12, Aug. 19, 1998, Sun Microsystems, Inc..

Sun Microsystems, Inc., "Java Card™ 2.0 Application Programming Interfaces," Oct. 13, 1997, Revision 1.0 Final.

\* cited by examiner fig-1 (PRIOR ART)

fig-2 fig-3 fig-4 fig-5 fig-6

SUPERPOSITION OF DATA OVER VOICE

TECHNICAL FIELD OF THE INVENTION

The present invention relates to a method for superposition of data over voice in voice channels between two or more communicating communication devices. Moreover, the present invention relates to apparatus for carrying out such a method. The invention also relates to computer-readable mediums with computer-readable software allowing communication devices, after having loaded the software, to carry out a method in accordance with the present invention. Finally, the present invention relates to a method of downloading computer-readable software allowing a communication device, after having loaded the software, to carry out a method in accordance with the present invention.

BACKGROUND OF THE INVENTION

U.S. Pat. No. 4,425,661 discloses a system which is able to transmit data information simultaneously with voice in a single channel. The data information is transmitted at frequencies less than the voice transmission. Use is made of a spread spectrum technique to transmit the digital data. To that end, in one embodiment, four signals of different frequencies are used. When a logic 1 is to be transmitted, a signal is generated which bounced between the two lower frequencies, whereas when a logic 0 is to be transmitted a signal is generated that is bounced between the two higher frequencies of the set of four frequencies. All four frequencies are below the voice band. Thus, harmonics of them will be spread through the voice band and the resulting noise will be smeared over the voice band. U.S. Pat. No. 4,425,661 is restricted to transmitting digital data by means of analog signals below the voice band. Moreover, due to the very low frequencies used for the transmission of the digital data transmission rates are low. Only binary values can be transmitted, no plurality of values can be encoded.

Several other prior art documents refer to using spread spectrum techniques for transmitting data and voice simultaneously. E.g., U.S. Pat. No. 5,073,899 relates to spread spectrum techniques for simultaneously transmitting data and voice over a single channel.

U.S. Pat. No. 4,313,197 discloses combined transmission of speech and non-speech on a single channel using spread spectrum multiplexing techniques. Non-speech signals are transmitted in a portion of the voice band where transmission of voice is poor, thus reducing the influence on the transmitted voice. Similar methods are disclosed by U.S. Pat. No. 4,512,013 and U.S. Pat. No. 4,523,311.

U.S. Pat. No. 4,672,605 relates to a technique for simultaneously transmitting data and voice in a single communication channel, in which digital data information is processed by means of a time compression multiplex technique and a spread spectrum technique.

Several prior art documents use steganography (i.e. obscuring information that is otherwise in plain sight) to simultaneously transmit digital data and voice. One example is U.S. Pat. No. 5,613,004 which combines steganography with cryptography in order to be able to encode and decode additional information into a stream of digitized data.

An other example is U.S. Pat. No. 5,745,604. The method disclosed impresses a digital identification signal on a carrier to be identified, e.g., an electronic signal related to music or a picture. An N-bit value digital signal is embedded onto the entire (analog) signal through the addition of a very low amplitude encodation signal which has the look and characteristics of pure noise. To that end, the noise already present in the signal is increased by a predetermined acceptable noise level, e.g., a 1 dB increase might be acceptable. When another carrier is suspect to be copied without permission, the content of the other carrier is compared to the original. Using statistical evaluating techniques it is identified whether the other carrier comprises the digital identification signal and, thus, indeed is an unauthorised copy. In U.S. Pat. No. 5,745,604 one knows the digital signal to look for. No method is disclosed for transmitting arbitrary data.

In a method disclosed by U.S. Pat. No. 5,748,763 (of the same inventor as U.S. Pat. No. 5,745,604) an imperceptible identification code is embedded throughout a source signal. This is done by modulating the source signal with a small noise signal in a coded fashion. Bits of a binary identification code may be referenced to control modulation of the source signal with the noise signal. This document also refers to using identification signals having amplitudes in the noise range.

U.S. Pat. No. 4,477,848 is directed to a system for recording of an audio message together with a data signal indicative of the audio message such that during playback of the message it can be established whether the playback is authentic or not. The data signal comprises digital information, e.g., as to the date and time of recording, but also as to the audio message itself. In one embodiment, the use of two distinct frequencies to represent logic 0 or logic 1 is disclosed, with reference to Frequency Shift Keying are used in traditional modems.

The present invention elaborates on the concept of dual-tone-multi-frequency (DTMF), which is now widely used in telecommunications. The essential features of the DTMF concept will be illustrated with reference to FIG. 1.

Figure 1:
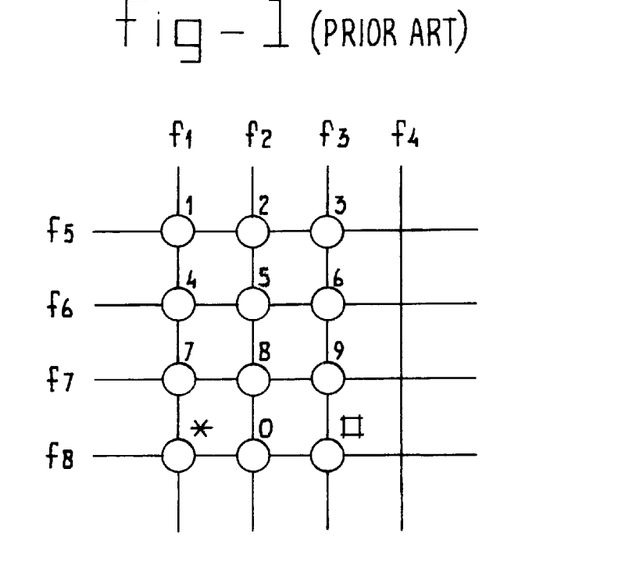
FIG. 1 schematically shows the prior art concept of dual-tone-multi-frequency.

FIG. 1 schematically shows, by means of circles, twelve keys of a telephone provided with keys. Ten of the keys are dedicated to numbers 0 through 9 whereas the other two keys are dedicated to functions indicated by a * and a #, respectively. Each of the keys is shown to be positioned on the intersection of two lines. For instance, key "1" is located on the intersection of two lines $f_1$ and $f_5$. Each of the lines $f_1, \ldots, f_8$ refers to a wire or the like connected to suitable oscillator means generating an analogue signal with frequency $f_1, \ldots, f_8$. The frequencies $f_1, \ldots, f_8$ all differ from one another. When a user of the telephone presses one of the keys, say key "1", an analogue signal will be generated comprising two analogue signals with two frequencies, e.g., $f_1$ and $f_5$. Thus, a signal with a unique combination of two different frequencies is generated. Similarly, pressing each of the other keys generates a signal with a unique combination of two different frequencies.

A receiving unit, for instance located in a telephone exchange for establishing a communication channel between a calling telephone and a telephone to be called, receives a sequence of signals generated by the user of the telephone and is provided with suitable filters for detecting the unique combination of two frequencies in each of the signals received. Thus, such a receiver is for instance able to identify the telephone number of a telephone to be called.

Of course, signals generated in such a way by a user may be used in another way, for instance, for transmitting encoded instructions to a receiving telecommunication device, instructing that telecommunication device, e.g., to connect the calling telephone to a special department of an office associated with the instruction concerned.

In the arrangement shown in FIG. 1, there are eight frequencies $f_1, \ldots, f_8$. In many telephone devices one of the frequencies (for instance $f_4$) is not used.

SUMMARY OF THE INVENTION

A general object of the present invention is to provide a method and means for transmitting digital data between two telecommunication devices when a communication channel between those telecommunication devices has been established avoiding the need to establish a separate channel for transmitting the digital data.

To obtain this object, the present invention provides a method of transmitting at least one message between at least a first communication device and at least a second communication device, via a communication channel allowing at least voice messages to be transmitted between said first and said second communication devices, the at least one message including data being subdivided in a sequence of basic data units, the method comprising the following steps:

a. encoding each of the basic data units as unique signals, each unique signal comprising a predetermined number of basic signals each basic signal having a unique fixed frequency;

b. transmitting a sequence of unique signals between the first and the second communication device during a sequence of fixed time periods, any one of the sequence of unique signals lasting at least one time period;

c. receiving and decoding the sequence of unique signals into the sequence of basic data units;

wherein the data is transmitted in the communication channel at least during a period that the communication channel is also available for transmitting voice signals.

In the method according to the invention a basic data unit corresponds to e.g. a "5", "#", or a character like the character "A". Such a basic data unit is represented by one or more unique signals, each unique signal comprising a predetermined number of basic signals. Each of these basic signals may be an analogue signal and has a unique fixed frequency. Thus, each basic data unit is encoded as one or more sets of basic signals which can be received and decoded afterwards by a receiving communication device. The unique signals are transmitted sequentially from one communication device to another in a sequence of fixed time periods. In a first embodiment, each unique signal is transmitted during one of the fixed time periods. In accordance with the invention, the sequence of fixed time periods at least partly overlaps the period that the communication channel is available for transmitting voice between the communication devices.

In a preferred embodiment, the basic signals have a predetermined amplitude, each amplitude of each of the basic signals being unique. Thus, detecting each of the basic signals can be based upon two independent parameters, i.e., its frequency and its amplitude. This improves the reliability of the data transmission.

Each communication channel has a certain noise level. The noise level can be detected by means known in the art. Preferably, each of the predetermined amplitudes is within a range of 10% above the noise level. Providing the basic signals with such amplitudes guarantees that a user of a receiving telecommunication device listening to the voice portion of the message only hears very weak peak signals related to the digital data. Indeed, the amplitudes may be chosen to be just above the background noise such, that is will be almost impossible for a listening user to distinguish the transmitted digital data from the background noise. Only statistical analysis of the message received will, then, reveal the presence of each basic signal. This analysis will be the basis for decoding the message.

In order to further improve the reliability of the data transmission, each of the unique signals may last a plurality of fixed time periods.

Further improvement of the reliability may also be obtained by providing each unique signal with a redundant set of basic signals. Then, when the receiving telecommunication device is unable to detect one of the basic signals belonging to a set of basic signals defining one unique signal, it is still able to derive the unique signal from the remaining basic signals being detected.

A transmitting telecommunication device in accordance with the present invention may transmit a message identifying message with data elements to a receiving telecommunication device prior to the transmission of the digital data itself. Such data elements, then, define at least portions of the protocol to be used between the telecommunication devices in order to carry out the method according to the present invention. Such data elements may be:

a first identifier identifying a set of frequencies from which each of the unique fixed frequencies is selected;

a second identifier identifying which frequencies are used by the first communication device and which frequencies are used by the second communication device;

a duration of each of the fixed time periods; and a request to change characteristics of transmission between the first and second communication device.

In case the basic signals have a predetermined amplitude, the message identifying message may also comprise the values of those predetermined amplitudes.

In a further embodiment, one of the communication devices may transmit a first message comprising a request to change characteristics of transmission between the communication devices; then, the other communication device may reply by transmitting a second message either confirming or denying the request to change. If the other telecommunication device denies the request to change, the second message may comprise a proposal for an alternative change of characteristics of transmission.

In order to introduce as little interference as possible between the digital data and the voice, the predetermined amplitudes of the basic signals may correspond to an acoustic frequency characteristic of the human ear. Such an acoustic frequency characteristic may be one as defined by international standardization institutions.

Alternatively, the predetermined amplitudes of the basic signals may correspond to acoustic frequency characteristics of the communication channel each communication channel has its own acoustic frequency characteristic which may be determined by means known in the art.

The present invention also relates to a transmitter for transmitting at least one message to at least one receiver via a communication channel allowing at least voice messages to be transmitted, the at least one message including data being subdivided in a sequence of basic data units, the transmitter comprising telephone means, oscillator means for producing a plurality of basic signals each having a unique fixed frequency and processing means connected to the telephone means and the oscillator means and arranged for:

a. encoding each of the basic data units as unique signals, each unique signal comprising a predetermined number of basic signals;

b. transmitting a sequence of unique signals to the receiver during a sequence of fixed time periods, each one of the sequence of unique signals lasting at least one time period;

wherein the data is transmitted in the communication channel at least during a period that the communication channel is also available for transmitting voice signals.

Moreover, the present invention relates to a receiver arranged to communicate with a transmitter as defined above, the receiver comprising telephone means and processing means connected to the telephone means and arranges for:

a. receiving a sequence of unique signals from the transmitter during a sequence of fixed time periods, any one of the sequence of unique signals lasting at least one time period, each unique signal comprising a predetermined number of basic signals, each basic signal having a unique fixed frequency;

b. decoding the sequence of unique signals into a sequence of basic data units;

wherein said unique signals ($us_j$) are transmitted in a communication channel at least during a period that the communication channel is also available for transmitting voice signals.

The invention also relates to a transceiver arranged for transmitting at least one first message to at least one receiver via a communication channel allowing at least voice messages to be transmitted, the at least one first message including data being subdivided in a first sequence of basic data units, the transmitter comprising telephone means, oscillator means for producing a plurality of basic signals each having a unique fixed frequency and processing means connected to the telephone means and the oscillator means and arranged for:

a. encoding each of the basic data units as unique signals, each unique signal comprising a predetermined number of basic signals;

b. transmitting a first sequence of unique signals to the receiver during a first sequence of fixed time periods, any one of the first sequence of unique signals lasting at least one time period;

wherein the data is transmitted in the communication channel at least during a period that the communication channel is also available for transmitting voice signals, the processing means also being arranged for:

c. receiving at least one second sequence of unique signals during a second sequence of fixed time periods, any one of the at least one second sequence of unique signals lasting at least one time period and comprising a unique, predetermined number of basic signals, each basic signal having a unique fixed frequency;

d. decoding the at least one second sequence of unique signals into a second sequence of basic data units.

In accordance with a further embodiment of the present invention an intelligent telephone device may be loaded with suitable software to carry out the method according to the present invention. Such software may be stored on a computer readable medium. Therefore, the present invention also relates to a computer readable medium comprising computer readable software allowing a communication device, after having loaded the software, to transmit at least one first message to at least one receiver via a communication channel allowing at least voice messages to be transmitted, the at least one first message including data being subdivided in a first sequence of basic data units, and to:

a. encode each of the basic data units as unique signals, each unique signal comprising a unique, predetermined number of basic signals, each basic signal having a unique fixed frequency;

b. transmit a first sequence of unique signals to the receiver during a first sequence of fixed time periods, any one of the first sequence of unique signals lasting at least one time period;

wherein the data is transmitted in the communication channel at least during a period that the communication channel is also available for transmitting voice signals.

However, such software may also be loaded into the intelligent telephone device by means of downloading through a telecommunication channel. Therefore, the present invention also relates to a computer data signal embodied in a carrier wave comprising computer readable software allowing a communication device, after having loaded the software, to transmit at least one first message to at least one receiver via a communication channel allowing at least voice messages to be transmitted, the at least one first message including data being subdivided in a first sequence of basic data units, and to:

a. encode each of the basic data units as unique signals, each unique signal comprising a predetermined number of basic signals, each basic signal having a unique fixed frequency;

b. transmit a first sequence of unique signals to the receiver during a first sequence of fixed time periods, any one of the first sequence of unique signals lasting at least one time period;

wherein the data is transmitted in the communication channel at least during a period that the communication channel is also available for transmitting voice signals.

BRIEF DESCRIPTION OF THE DRAWINGS

The present invention will be illustrated with reference to some drawings which are intended to illustrate the present invention and not to limit its scope.

DETAILED DESCRIPTION OF THE EMBODIMENTS

Figure 2:
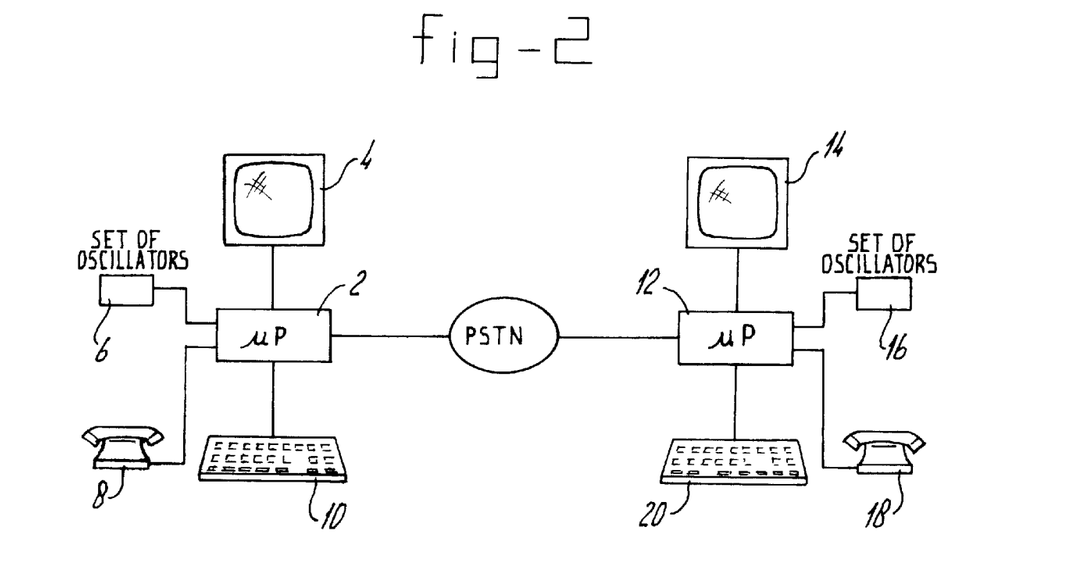
FIG. 2 shows, in a schematical way, a telecommunication system arranged to be able to carry out the method according to the present invention.

FIG. 2 shows two communication devices communicating with one another through a communication channel, e.g., established through the public switched telephone network (PSTN) 22.

The first communication device comprises a computer system 2 which is connected to a monitor 4 (or other type of display), a set of oscillators 6, a telephone 8, and a keyboard 10. As will be evident to a person skilled in the art, other means may be provided to facilitate the user of the first communication device in communicating with other communication devices. For instance, a mouse or the like may be provided to provide the computer system 2 with suitable instructions. Moreover, it is to be noted that the telephone 8 is shown to be a separate unit. However, the telephone 8 is only to indicate the presence of equipment to carry out the functions of a conventional telephone. It may be entirely or partially part of the computer system 2.

The set of oscillators 6 is shown to be separate from the computer system 2. However, the set of oscillators 6 may be included in the computer system 2.

The other communication device is provided with a computer system 12 which is connected to a monitor 14, a set of oscillators 16, a telephone 18, and a keyboard 20. The same remarks as are made with respect to the first communication device are applicable to the second communication device 12–20.

In accordance with the present invention, the arrangement shown in FIG. 2 is arranged such that it is able to transmit digital data over analogue telephone lines, while they are used for human conversation. This allows the exchange of digital data between e.g. intelligent telephones, set top boxes or other such devices and central computing facilities, the Internet, etc. Such digital data to be transmitted may e.g. include digital payment for communication services or for products purchased during the conversation, for cryptographic authentication of parties involved in the conversation or for loading (application) software into an intelligent telephone.

In accordance with the method according to the present invention, a concept of multi-tone-multi-frequency is used. For instance, the set of oscillators 6, 16 comprise eight oscillators. Of course, any other number of oscillators may be used without departing the scope of the present invention. It is even possible to use one oscillator and a number of dividers to generate a predetermined number of signals with different frequencies. However, such an embodiment would suffer from the disadvantage that all harmonics would amplify one another. Contrary, using different oscillators with different frequencies not being multiples of one another smears the harmonics through the frequency band, thus reducing noise.

When a message is to be transmitted digitally from one communication device to another the message is divided into basic data units. For instance, the message may comprise six basic data units, e.g. a processor instruction of six characters.

The computer system 2, 12 is arranged to encode each of the basic data units as one or more unique signals. Preferably, each of the same basic data units is encoded as the same unique signal $us_j$ (or the same set of unique signals). For instance, in FIG. 3, it is shown that the message comprises six unique signals $us_j$, however, both unique signal $us_1$ and $us_2$ occurring twice. However, alternatively, different communication devices may use different sets of unique signals for identifying the same basic data unit.

Messages may e.g. be transmitted in a half-duplex mode or a full-duplex mode.

Figure 3:
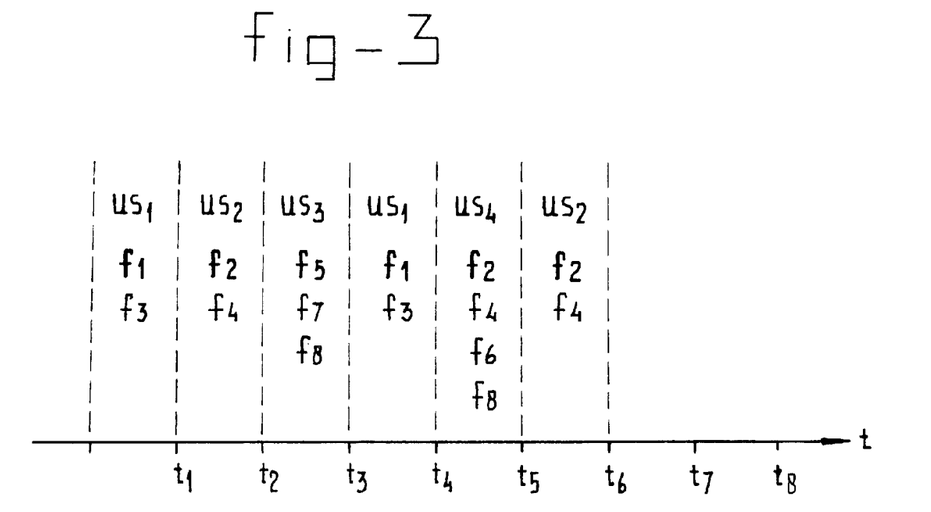
FIGS. 3, 4, 5 and 6 show different diagrams to further illustrate signals used in the present invention.

Any unique signal $us_j$ comprises a predetermined number of basic signals $b_i$. Each of the basic signals $b_i$ has a unique fixed frequency $f_1$. These basic signals $b_1$ are produced by the set of oscillators 6, 16. The computer system 2 receiving those basic signals $b_i$ assembles each unique signal as a predetermined combination of basic signals. Thus, as shown in FIG. 3, unique signal $us_1$ comprises two basic signals $b_1$ and $b_3$, having frequencies $f_1$ and $f_3$, respectively. Unique signal $us_1$ may, e.g., relate to the character "A".

Also unique signal $us_2$ may comprise two basic signals. As shown in FIG. 3 these basic signals are $b_2$ and $b_4$, having frequencies $f_2$ and $f_4$, respectively.

However, the unique signals $us_j$ may comprise another number of basic signals $b_i$. As shown, unique signal $us_3$ comprises three basic signals $b_3$, $b_7$, and $b_8$, having frequencies $f_5$, $f_7$, and $f_8$, respectively. Similarly, unique signal $us_4$ comprises four basic signal $b_2$, $b_4$, $b_6$, and $b_8$, having frequencies $f_2$, $f_4$, $f_6$, and $f_8$, respectively.

In accordance with the present invention the message comprising, e.g., the six unique signals shown in FIG. 3, is transmitted from a transmitting communication device to a receiving communication device in a sequence of fixed time periods $t_1, t_2, t_3, \ldots$.

Preferably, each of the unique signals $us_j$ lasts exactly one of the fixed time periods. Thus, a receiving communication device knowing the duration of the fixed time periods and knowing the values of the frequencies $f_1, f_2, \ldots, f_8$ is then able, by means known in the art, to detect each basic signal $b_i$ present within each of the fixed time periods $t_1, t_2, t_3, \ldots$. Then the receiving communication device is also able to decode the unique signals $us_j$ received into the original basic data units.

Figure 4:
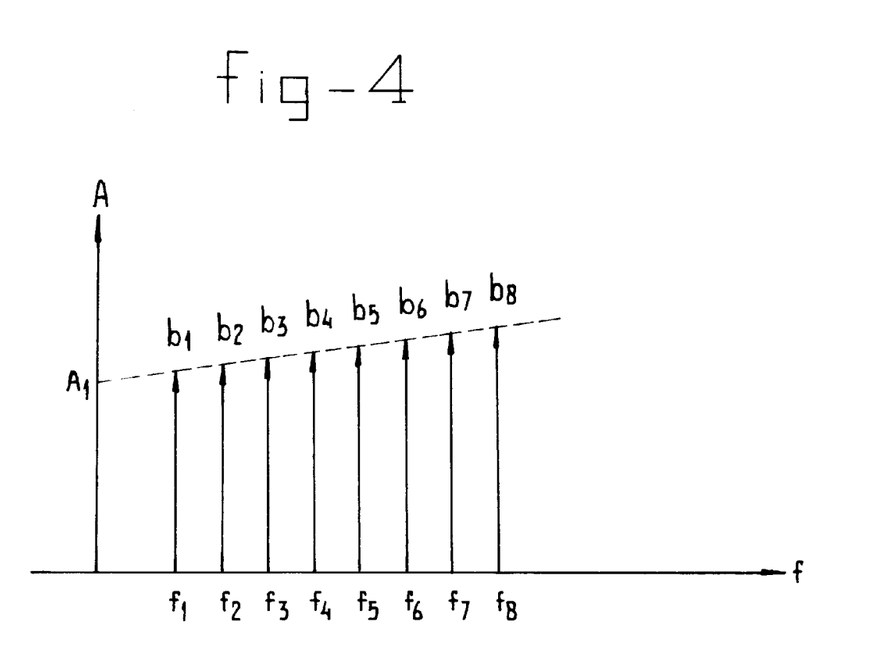

FIG. 4 schematically shows the amplitudes of the basic signals $b_1, b_2, \ldots, b_8$ as a function of frequency in one possible embodiment of the present invention. As shown in FIG. 4, there is a fixed relationship between the amplitudes of the basic signals $b_1, b_2, \ldots, b_8$. In FIG. 4 this fixed relation is:

$$A_i = A_1 + (f_1 - f_i) \Delta A$$

with:
 $i = 1, \ldots, 8$
 $A_i$ = amplitude of basic signal $b_i$
 $\Delta A$ = predetermined amplitude difference value.

However, it is envisaged that there might be another fixed relation between the amplitudes of the different basic signals $b_1, b_2, \ldots, b_8$. For instance, each of the amplitudes $A_i$ is unique. Then, each of the basic signals $b_i$ is characterized by two different unique parameters, i.e., its frequency $f_1$ and its amplitude $A_i$. This provides the possibility to search for two different, independent parameters to detect the basic signals $b_1$, which improves detection reliability.

When the amplitudes $A_i$ are far above the noise level of the communication channel established between communicating communication devices each transmission of digital data during a human conversation will result in audible peeps in the telephone receiver of the telephone 8, 18. In order to avoid such an interference, the present invention, in a preferred embodiment, provides for the amplitudes $A_i$ being selected to be only slightly above the noise level of the communication channel. The amplitudes may, for instance, be within a range of 10% above the noise level of the communication channel. If so, then, by means of known statistical methods of analysis, it is possible to detect the presence of each basic signal and to distinguish each basic signal from the background noise. Such a statistical analysis may be based on correlation measurements which distinguish the presence of the basic signals from the noise, since noise is an uncorrelated signal, as known to persons skilled in the art.

Figure 5:
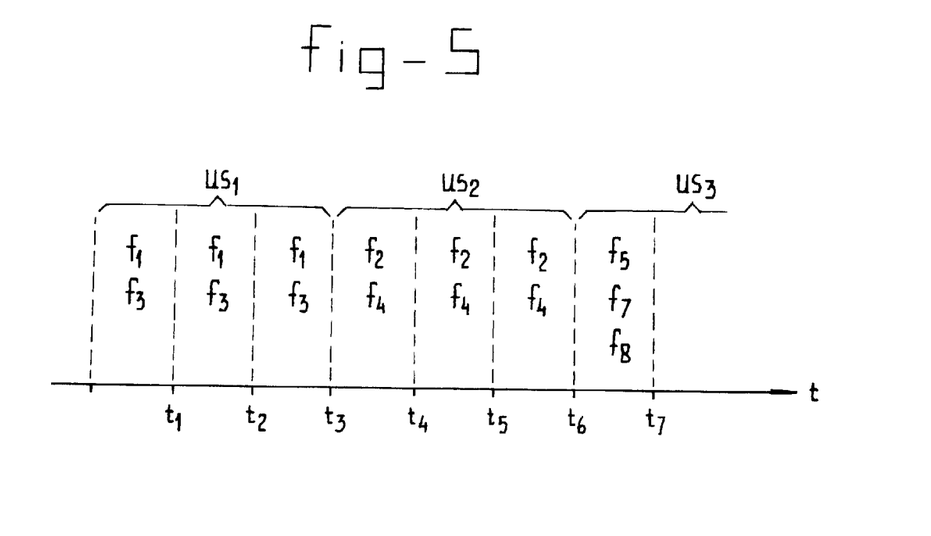

FIG. 5 shows a further embodiment of the present invention. FIG. 5 shows that the sets of basic signals of each of the unique signals $us_j$ are transmitted during several fixed time periods. In the embodiment shown in FIG. 5, each set of basic signals forming one unique signal $us_j$ is transmitted during three subsequent fixed time periods. This improves the reliability of detection.

Figure 6:
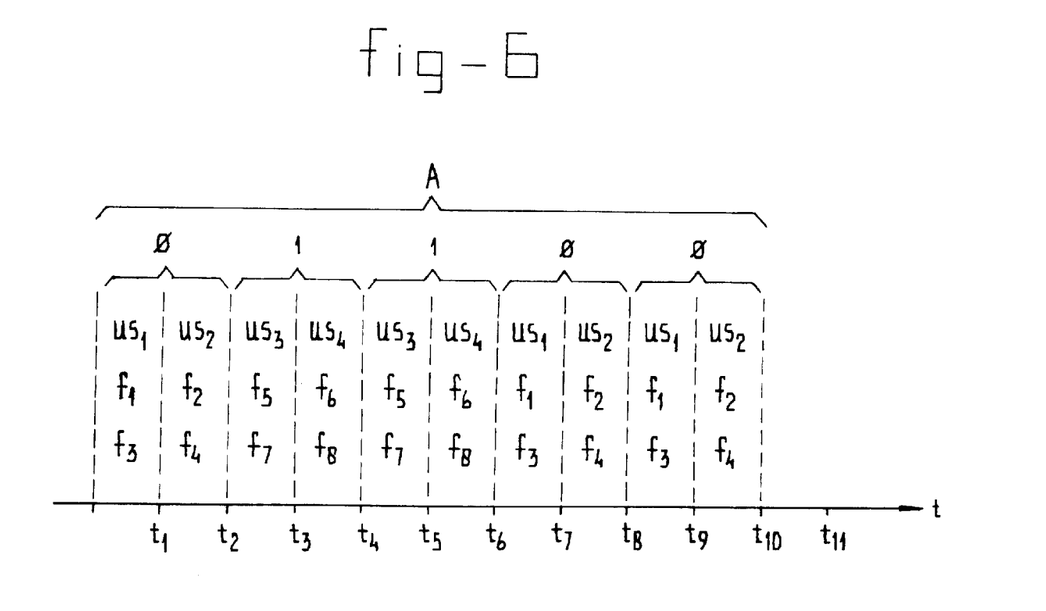

Alternatively, more complex encodings may be used. One example of such a more complex encoding is shown in FIG. 6. The scheme of FIG. 6 comprises redundancy in order to enhance the reliability of the transmission. In the example of FIG. 6 it is assumed that the character "A" is represented by the binary sequence 01100, each 0 is represented by two subsequent unique signals $us_1$ and $us_2$, whereas each 1 is represented by two subsequent unique signals $us_3$ and $us_4$. $us_1$, $us_2$, $us_3$, and $us_4$, respectively, are represented by the following sets of basic signals: $b_1/b_3$, $b_2/b_4$, $b_5/b_7$, and $b_6/b_8$, respectively.

Thus, within each fixed time period $t_1, t_2, \ldots$, there is redundancy in the sense that when one of the two basic signals present within the time period concerned is detected, the unique signal $us_j$ concerned is known. Moreover, when in two subsequent time periods only one out of four basic signals is detected it can be established whether a 0 or a 1 was transmitted. Therefore, the 0 and 1 signals can be transmitted with a very great chance of being detected by a receiving communication device. Then, of course, also detection of the character "A" has a high probability.

It is observed that FIGS. 3, 5, and 6 only provide example of encoding schemes. Other encoding schemes are assumed to fall within the scope of the present invention.

Preferably, there is a predetermined set of basic signals $b_i$ which is known to each of the communication devices. Moreover, preferably, the encoding mechanism is fixed.

In one embodiment each of the unique signals $us_j$ has the same, fixed number of basic signals $b_i$.

It is one option that each of the communication devices knows in advance each of the characteristics of the transmission. Such characteristics may be stored in suitable memories available to the communication devices. However, alternatively, some or all of the characteristics of the transmission may, e.g., be loaded into a communication device setting up a communication with another communication device. To that end, a message transmitted to a receiving communication device may start as a message identifying message with a set of data elements to define the characteristics of the transmission. For instance, an identifier identifying a set of frequencies $f_1, f_2, \ldots$, from which each of the unique fixed frequencies is selected may be transmitted to a receiving communication device prior to transmitting the content of a message. Also a second identifier identifying which frequencies are used by the first communication device and which frequencies are used by the second communication device may be transmitted. Moreover, the duration of each of the fixed time periods $t_1, t_2, \ldots$, may be transmitted first. It is also possible that a request to change characteristics of transmission between two or more communication devices is transmitted first. A communication according to the invention may, e.g., start with predetermined transmission characteristics but they may be changed during transmission.

When such a request to change the characteristics has been received by a communication device it may reply by transmitting a message either confirming or denying the request to change. When it denies the request to change it may propose an alternative change of characteristics to the communication device requesting the change.

Similarly, when predetermined amplitudes $A_i$ are used, as shown in FIG. 4, the predetermined amplitudes $A_i$ of the basic signals $b_i$ may be transmitted prior to transmission the content of a message. Also a valid set of basic signals $b_i$ may be transmitted prior to transmission of the content of a message.

When predetermined amplitudes $A_1$ are used, these amplitudes $A_i$ of the basic signals $b_i$ may be related to the acoustic characteristics of the human ear (dB(A)). Such acoustic characteristics of the human ear are established by international standardization institutes and known to persons skilled in the art. Then, the appreciation of the basic signals $b_i$ received by a human ear will be substantially the same for each of the frequencies $f_i$. This results in minimum intrusion and optimal use of the available bandwidth.

Alternatively, the frequency characteristics of the communication channel may be established by means known in the art and the amplitudes $A_i$ may be related to these frequency characteristics of the communication channel. This will increase the reliability and enhance the effective data rate.

When a telephone conversation is set up, the system is engaged during some time by a dialling or a wake-up signal. In one embodiment of the present invention, digital data may already be transmitted from one communication device to another during the transmission of such a dialling or wake-up signal. Then, high bandwidth communication is possible since the communication channel is idle at the start of a voice communication. Moreover, this allows uploading of e.g. application program code (such as Java class files) to transmitting and receiving intelligent telephone devices. During such a dialling signal, e.g., data identifying the dialling communication device may be transmitted.

In order to further reduce any interference caused by the transmission of the digital data the message may be filtered upon receipt such that the digital data does not reach the telephone receiver of the telephone 8, 18. This is possible since the frequencies $f_i$ of the basic signals $b_i$ are known to the devices and they can filter the basic signals $b_i$ by means of small bandwidth filter turned to the respective frequencies $f_i$.

The system described above provides the possibility of exchanging digital data during a human telephone conversation. Data that may be exchanged includes digital payment for communication services or for products purchased during the conversation, for cryptographic authentication of the parties in the conversation or for loading (application) software into intelligent telephone devices. In many cases, such digital data only needs a short period to be transmitted from one communication device to another. Therefore, if such digital data is superposed to voice in accordance with the present invention any possible intrusion is in most cases restricted, even if no special measures are taken to reduce such intrusion. Moreover, the application of the present invention avoids the use of special modems.

What is claimed is:

1. Method of transmitting at least one message between at least a first communication device (2, 4, 6, 8, 10) and at least a second communication device (12, 14, 16, 18, 20), via a communication channel (22) allowing at least voice messages to be transmitted between said first and said second communication devices, said at least one message including data being subdivided in a sequence of basic data units, said method comprising the following steps:
   a. encoding each of the basic data units as at least one unique signal ($us_j$), each unique signal ($us_j$) comprising a plurality of basic signals ($b_i$) each basic signal having a unique fixed frequency ($f_i$);
   b. transmitting a sequence of unique signals ($us_j$) between said first and said second communication devices during a sequence of fixed time periods (t1, t2, t3, . . . ), any unique signal of said sequence of unique signals ($us_j$) lasting at least one time period;
   c. receiving and decoding said sequence of unique signals ($us_j$) into said sequence of basic data units;
said data being transmitted in said communication channel at least during a period that said communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

2. Method according to claim 1 wherein each of said predetermined amplitudes ($A_i$) is only slightly above said noise level of said communication channel, and said method comprises statistical methods of analysis to detect the presence of each of said basic signals and to distinguish each of said basic signals from said noise level.

3. Method according to claim 1 wherein each different unique signal ($us_j$) comprises at least one basic signal ($b_i$) uniquely identifying said different unique signal ($us_j$).

4. Method according to claim 1 wherein each of said predetermined amplitudes ($A_i$) is unique.

5. Method according to claim 1 wherein each of said unique signals ($us_j$) lasts a plurality of said fixed time periods.

6. Method according to claim 1 wherein said sequence of unique signals ($us_j$) comprises data identifying the first communication device transmitting said at least one message.

7. Method according to claim 1 wherein each of said unique signals ($us_j$) has the same, fixed number of basic signals ($b_i$) derived from a predetermined set of basic signals ($b_i$).

8. Method according to claim 1 wherein at least one of said unique signals ($us_j$) comprises at least 3 basic signals ($b_i$).

9. Method according to claim 1 wherein said message is a message identifying message and comprises at least one from the following set of data elements:
  a first identifier identifying a set of frequencies ($f_1$, $f_2$, $f_3$, ... ) from which each of the unique fixed frequencies is selected;
  a second identifier identifying which frequencies are used by the first communication device and which frequencies are used by the second communication device;
  a duration of each of the fixed time periods; and
  a request to change characteristics of transmission between said first and second communication device.

10. Method according to claim 1 wherein said message comprises at least the following data element: the predetermined amplitudes ($A_i$) of the basic signals ($b_i$).

11. Method according to claim 7 wherein said message comprises at least the following data element: the predetermined set of basic signals ($b_i$).

12. Method according to claim 1 wherein said first communication device transmits a first message comprising a request to change characteristics of transmission between said first and second communication device and said second communication device replies by transmitting a second message either confirming or denying said request to change.

13. Method according to claim 12 wherein, if said request has been denied, said second message comprises a proposal for an alternative change of characteristics of transmission.

14. Method according to claim 1, wherein each of the predetermined amplitudes of the basic signals ($b_i$) corresponds to acoustic frequency characteristics of the human ear.

15. Method according to claim 1, wherein each of the predetermined amplitudes of the basic signals ($b_i$) corresponds to acoustic frequency characteristics of said communication channel.

16. Method according to claim 1 wherein step b comprises transmitting a dialling signal and said data is already at least partly transmitted together with said dialling signal.

17. Method according to claim 1 wherein said second communication device comprises a telephone receiver and said message is filtered upon receipt such that said data does not reach said telephone receiver.

18. Transmitter (2, 4, 6, 8, 10) for transmitting at least one message to at least one receiver (12, 14, 16, 18, 20), via a communication channel (22) allowing at least voice messages to be transmitted, said at least one message including data being subdivided in a sequence of basic data units, said transmitter comprising telephone means (8), oscillator means (6) for producing a plurality of basic signals ($b_i$) each having a unique fixed frequency ($f_i$) and processing means (2) connected to said telephone means (8) and said oscillator means (6) and arranged for:
  a. encoding each of the basic data units as at least one unique signal ($us_j$), each unique signal ($us_j$) comprising a plurality of basic signals ($b_i$);
  b. transmitting a sequence of unique signals ($us_j$) to said receiver during a sequence of fixed time periods (t1, t2, t3, ... ), any unique signal of said sequence of unique signals ($us_j$) lasting at least one time period;
said data being transmitted in said communication channel at least during a period that said communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

19. Transmitter according to claim 18, wherein each different unique signal ($us_j$) comprises at least one basic signal ($b_i$) uniquely identifying said different unique signal ($us_j$).

20. Transmitter according to claim 18 arranged to provide each of said basic signals with a unique predetermined amplitude ($A_i$).

21. Transmitter according to claim 18, wherein each of said predetermined amplitudes ($A_i$) is only slightly above said noise level of said communication channel, and said method comprises statistical methods of analysis to detect the presence of each of said basic signals and to distinguish each of said basic signals from said noise level.

22. Transmitter according to claim 18 arranged to transmit each of said unique signals ($us_j$) during a plurality of said time periods.

23. Transmitter according to claim 18 arranged to provide said sequence of unique signals ($us_j$) with data identifying said transmitter.

24. Transmitter according to claim 18 arranged to provide each of said unique signals ($us_j$) with the same, fixed number of basic signals ($b_i$) derived from a predetermined set of basic signals ($b_i$).

25. Transmitter according to claim 18, wherein at least one of said unique signals ($us_j$) comprises at least 3 basic signals ($b_i$).

26. Transmitter according to claim 18 arranged to provide said message as a message identifying message with at least one from the following set of data elements:
  a first identifier identifying a set of frequencies ($f_1$, $f_2$, $f_3$, ... ) from which each the unique fixed frequencies is selected;
  a second identifier identifying which frequencies are used by the first communication device and which frequencies are used by the second communication device;
  duration of each of the fixed time periods; and
  a request to change characteristics of transmission between said transmitter and said receiver.

27. Transmitter according to claim 18, arranged to provide said message with at least the following data element: the predetermined amplitudes ($A_i$) of the basic signals ($b_i$).

28. Transmitter according to claim 24 arranged to provide said message with at least the following data element: the predetermined set of basic signals ($b_i$).

29. Transmitter according to claim 18 arranged to determine each of the predetermined amplitudes of the basic signals ($b_i$) on the basis of an acoustic frequency characteristic of the human ear.

30. Transmitter according to claim 18 arranged to determine each of the amplitudes of the basic signals ($b_i$) on the basis of acoustic frequency characteristics of said communication channels.

31. Transmitter according to claim 18 arranged to transmit a dialling signal in step b and said data already at least partly together with said dialling signal.

32. Receiver arranged to communicate with a transmitter according to claim 18, said receiver comprising telephone means (18) and processing means (12) connected to said telephone means (18) and arranged for:
   a. receiving a sequence of unique signals ($us_j$) from said transmitter during a sequence of fixed time periods (t1, t2, t3, ... ), any unique signal of said sequence of unique signals ($us_j$) lasting at least one time period and comprising a plurality of basic signals ($b_i$), each basic signal having a unique fixed frequency ($f_i$);
   b. decoding said sequence of unique signals ($us_j$) into a sequence of basic data units; said unique signals ($us_j$) being transmitted in a communication channel at least during a period that the communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

33. Receiver according to claim 32 arranged to receive a first message from said transmitter, comprising a request to change characteristics of transmission between said transmitter and said receiver and to reply by transmitting a second message either confirming or denying said request to change.

34. Receiver according to claim 33 arranged to reply with a proposal for an alternative change of characteristics of transmission if said request has been denied.

35. Receiver according to claim 32 comprising a telephone receiver and filtering said message upon receipt such that said data does not reach said telephone receiver.

36. Receiver according to claim 32, wherein each of said predetermined amplitudes ($A_i$) is only slightly above said noise level of said communication channel, and said method comprises statistical methods of analysis to detect the presence of each of said basic signals and to distinguish each of said basic signals from said noise level.

37. Computer readable medium comprising computer readable software allowing a communication device (2, 4, 6, 8, 10), after having loaded said software, to transmit at least one message to at least one receiver (12, 14, 16, 18, 20), via a communication channel (22) allowing at least voice messages to be transmitted, said at least one message including data being subdivided in a sequence of basic data units, and to:
   a. encode each of the basic data units as at least one unique signal ($us_j$), each unique signal ($us_j$) comprising a plurality of basic signals ($b_i$), each basic signal having a unique fixed frequency ($f_i$);
   b. transmit a sequence of unique signals ($us_j$) to said receiver during a sequence of fixed time periods (t1, t2, t3, ... ), any unique signal of said sequence of unique signals ($us_j$) lasting at least one time period;
said data being transmitted in said communication channel at least during a period that said communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

38. Computer readable medium comprising computer readable software allowing a communication device (12, 14, 16, 18, 20), after having loaded said software, to:
   a. receive at least one sequence of unique signals ($us_j$) from a transmitter during a sequence of fixed time periods (t1, t2, t3, ... ), any unique signal of said at least one sequence of unique signals ($us_j$) lasting at least one time period and comprising a plurality of basic signals ($b_i$), each basic signal having a unique fixed frequency ($f_i$);
   b. decode said at least one sequence of unique signals ($us_j$) into a sequence of basic data units, said unique signals ($us_j$) being transmitted in a communication channel at least during a period that the communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

39. Computer program product comprising computer readable software allowing a communication device (2, 4, 6, 8, 10), after having loaded said software, to transmit at least one message to at least one receiver (12, 14, 16, 18, 20), via a communication channel (22) allowing at least voice messages to be transmitted, said at least one message including data being subdivided in a sequence of basic data units, and to:
   a. encode each of the basic data units as at least one unique signal ($us_j$), each unique signal ($us_j$) comprising a plurality of basic signals ($b_i$), each basic signal having a unique fixed frequency ($f_i$);
   b. transmit a sequence of unique signals ($us_j$) to said receiver during a sequence of fixed time periods (t1, t2, t3, ... ), any unique signal of said sequence of unique signals ($us_j$) lasting at least one time period;
said data being transmitted in said communication channel at least during a period that said communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant encoding over a set of basic signals ($b_i$).

40. Computer program product comprising computer readable software allowing a communication device (12, 14, 16, 18, 20), after having loaded said software, to:
   a. receive at least one sequence of unique signals ($us_j$) from a transmitter during a sequence of fixed time periods (t1, t2, t3, ... ), any unique signal of said at least one sequence of unique signals ($us_j$) lasting at least one time period and comprising a plurality of basic signals ($b_i$), each basic signal having a unique fixed frequency ($f_i$);
   b. decode said at least one sequence of unique signals ($us_j$) into a sequence of basic data units,
said unique signals ($us_j$) being transmitted in a communication channel at least during a period that the communication channel is also available for transmitting voice signals, said basic signals ($b_i$) each having a predetermined amplitude ($A_i$) characterized in that said communication channel has a noise level and each of said predetermined amplitudes is within a range of 10% above said noise level, and each of said unique signals ($us_j$) comprises a redundant set of basic signals ($b_i$).

* * * * *